UNITED STATES PATENT OFFICE.

FRANCIS E. GALLAGHER, OF NEWTON, AND HARRY S. MORK, OF BOSTON, MASSACHUSETTS, ASSIGNORS TO STANDARD ALCOHOL COMPANY, OF NEW YORK, N. Y., A CORPORATION OF MAINE.

PROCESS OF PRODUCING FERMENTABLE SUGARS.

1,096,030. Specification of Letters Patent. Patented May 12, 1914.

No Drawing. Application filed July 15, 1912. Serial No. 709,568.

*To all whom it may concern:*

Be it known that we, (1) FRANCIS E. GALLAGHER and (2) HARRY S. MORK, citizens of the United States, residing at (1) Newton and (2) Boston, in the counties of (1) Middlesex and (2) Suffolk, and State of Massachusetts, have invented certain new and useful Improvements in Processes of Producing Fermentable Sugars, of which the following is a specification.

This invention relates to the production of fermentable sugars from ligno-cellulose, such as sawdust or wood-waste, and from other cellulosic raw materials. According to the invention, the cellulosic material is subjected to hydrolysis in presence of the reaction products in dilute solution of sulfuric acid and a suitable chlorid.

The process may be carried out as follows: Sawdust, wood-waste or other cellulosic raw material, preliminarily freed, in case of resinous woods, from volatile hydrocarbons, is digested by means of steam under pressure in presence of dilute sulfuric and hydrochloric acids obtained by reacting with sulfuric acid upon a soluble chlorid. The digestion may be carried out under widely varying conditions, but it is preferred to conduct the operation in a closed digester, under a steam pressure of 60 to 135 pounds per square inch. According to the character of the raw materials and the conditions of the process, the maximum percentage of fermentable sugars may be attained in fifteen to sixty minutes. The sulfuric and hydrochloric acids may be present in molecular proportions, or with an excess of either component of the mixture. For example, one per cent. of sulfuric acid and one per cent. of sodium chlorid yielded, after digestion with sawdust, an extract containing 28.2 per cent. of total solids and 25.8 per cent. of reducing sugars. Similarly, a mixture of 1.5 per cent. of sulfuric acid and 1.5 per cent. of calcium chlorid yielded an extract containing 27.5 per cent. of total solids and 23.5 per cent. of reducing sugars.

A mixture of sulfuric acid and a soluble chlorid yields among its reaction products sulfuric and hydrochloric acids, because even if no excess of sulfuric acid is employed above the molecular equivalent of the soluble chlorid, the condition of equilibrium in dilute solution is such that a portion of the sulfuric acid remains in a free and uncombined state, or in a condition in which it is able to exert a hydrolytic action equivalent to that of the acid in the free state.

I claim:

1. In a process of producing fermentable sugars from ligno-cellulose or other cellulosic material, the step which consists in digesting the mass under pressure in presence of the reaction products in dilute solution of sulfuric acid and a soluble chlorid of a metal.

2. In a process of producing fermentable sugars from ligno-cellulose or other cellulosic material, the step which consists in digesting the mass under pressure in presence of the reaction products in dilute solution of sulfuric acid and sodium chlorid.

In testimony whereof, we affix our signatures in presence of two witnesses.

FRANCIS E. GALLAGHER.
HARRY S. MORK.

Witnesses:
ARTHUR D. LITTLE,
AMY MONTGOMERY.